(12) United States Patent
Wu et al.

(10) Patent No.: US 7,239,382 B2
(45) Date of Patent: Jul. 3, 2007

(54) POLARIZING PLATES GRADING METHOD

(75) Inventors: Jui-Chi Wu, Taoyuan (TW); Yao-Chung Cheng, Taoyuan (TW)

(73) Assignee: Optimax Technology Corporation, Taoyuan (TW)

( * ) Notice: Subject to any disclaimer, the term of this patent is extended or adjusted under 35 U.S.C. 154(b) by 274 days.

(21) Appl. No.: 10/993,255

(22) Filed: Nov. 19, 2004

(65) Prior Publication Data

US 2005/0200844 A1 Sep. 15, 2005

(30) Foreign Application Priority Data

Mar. 11, 2004 (TW) .............................. 93106561 A

(51) Int. Cl.
*G01N 21/00* (2006.01)
(52) U.S. Cl. ..................... 356/239.2; 356/367; 356/402
(58) Field of Classification Search .................. 349/19; 356/420, 237.1, 239.2, 32, 239.1, 364–368, 356/402; 702/40, 134
See application file for complete search history.

(56) References Cited

U.S. PATENT DOCUMENTS

| | | | | |
|---|---|---|---|---|
| 3,811,775 | A * | 5/1974 | Abu-saud | ..................... 356/35 |
| 4,166,871 | A * | 9/1979 | Schuler | ................... 427/163.1 |
| 4,310,242 | A * | 1/1982 | Genco et al. | ................ 356/128 |
| 6,055,053 | A * | 4/2000 | Lesniak | ....................... 356/366 |
| 6,647,162 | B2 * | 11/2003 | Kim et al. | ..................... 385/13 |
| 2002/0015807 | A1 * | 2/2002 | Sugino et al. | .............. 428/1.31 |
| 2002/0097395 | A1 * | 7/2002 | Smith et al. | ............. 356/239.2 |
| 2005/0237526 | A1 * | 10/2005 | Yeh et al. | .................... 356/369 |

* cited by examiner

*Primary Examiner*—Layla G. Lauchman
*Assistant Examiner*—Daniel Cartoon
(74) *Attorney, Agent, or Firm*—Alan Kamrath; Kamrath & Associates PA

(57) ABSTRACT

In a polarizing plate grading method a first measurement range $A_1$ is chosen on a polarizing plate. After conducting an initial measurement by putting the polarizing plate under $X_1°$ C. for $Y_1$ hours, the first measurement range is measured to obtain the maximum chromatic value $Z_{1max}$ (NIT,cd/m), and the minimum chromatic value $Z_{1min}$. The minimum value is subtracted from the maximum value to obtain the net chromatic difference value $W_1$. The temperature change measurement is conducted by putting the polarizing plate under $X_2°$ C. for $Y_2$ hours and, then, the recovery measurement is conducted on the polarizing plate by putting the polarizing plate under $X_3°$ C. for $Y_3$ hours. A first measurement range is measured to obtain the maximum chromatic value $Z_{3max}$ and the minimum chromatic value $Z_{3min}$. The minimum chromatic value is subtracted from the maximum chromatic value to obtain the net chromatic difference value $W_3$. The polarizing plate grading index Q is obtained by dividing the value obtained from subtracting the net chromatic difference value $W_1$ obtained in the initial measurement from the net chromatic difference value $W_3$ obtained in the recovery measurement, by the net chromatic difference value $W_1$ so as to grade the polarizing plates.

14 Claims, 8 Drawing Sheets

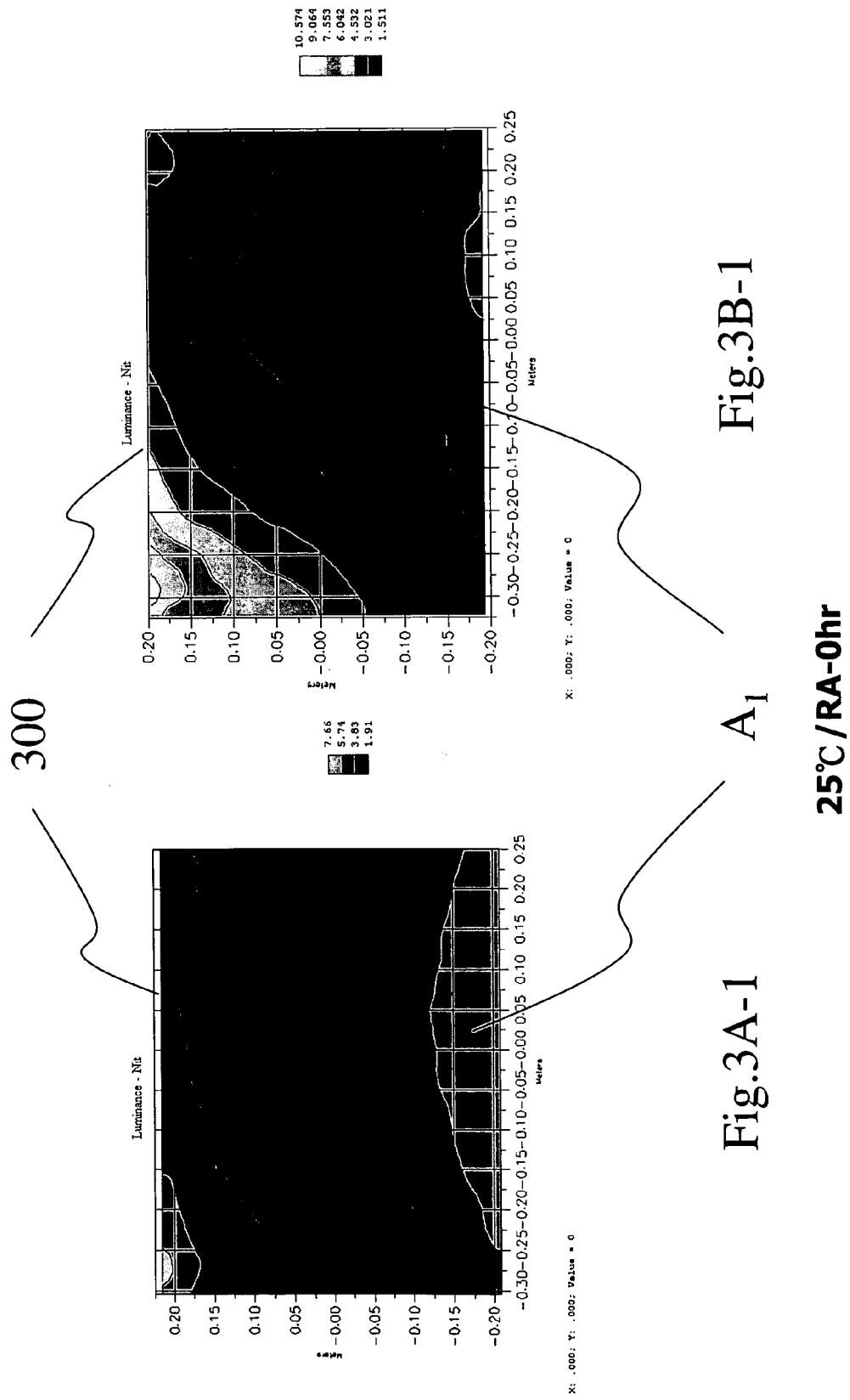

80 °C/RA-24hr

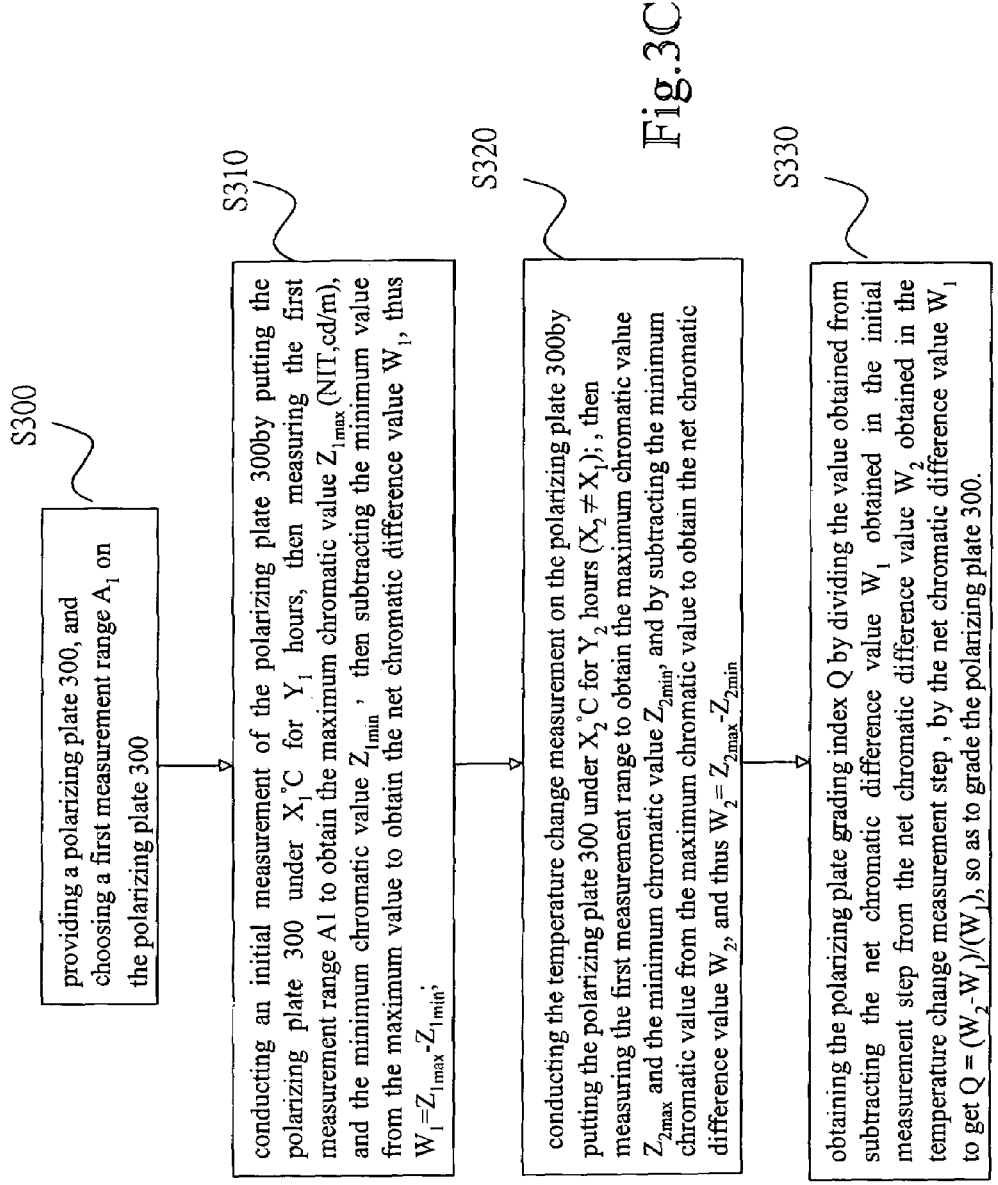

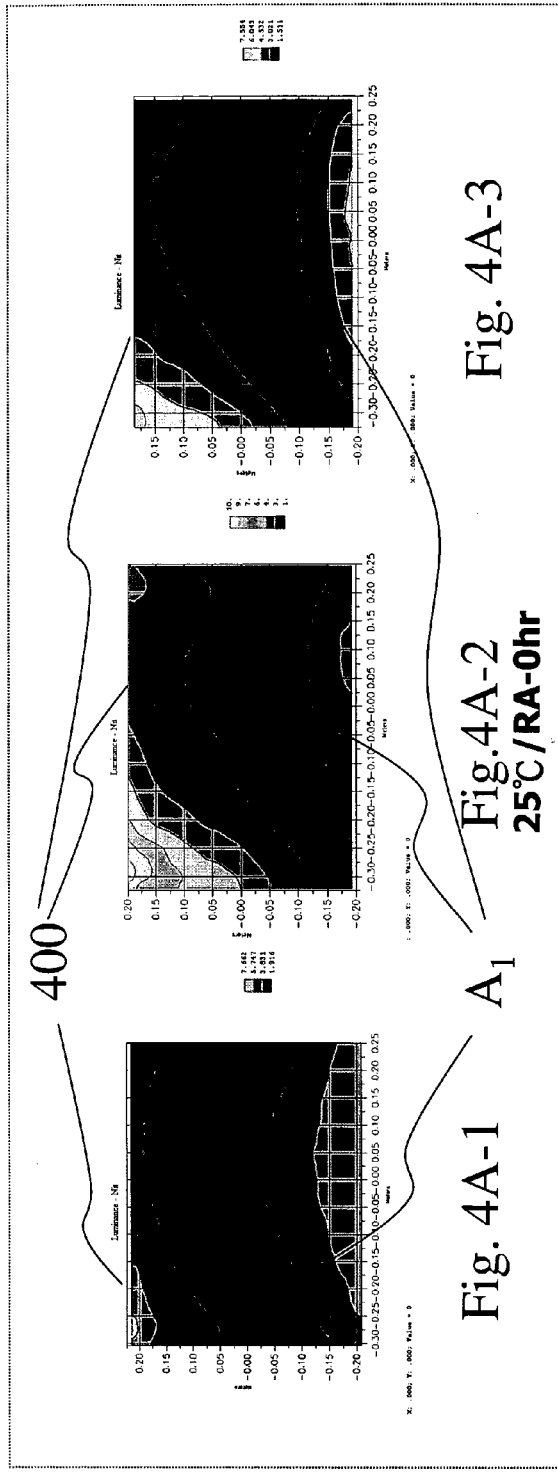
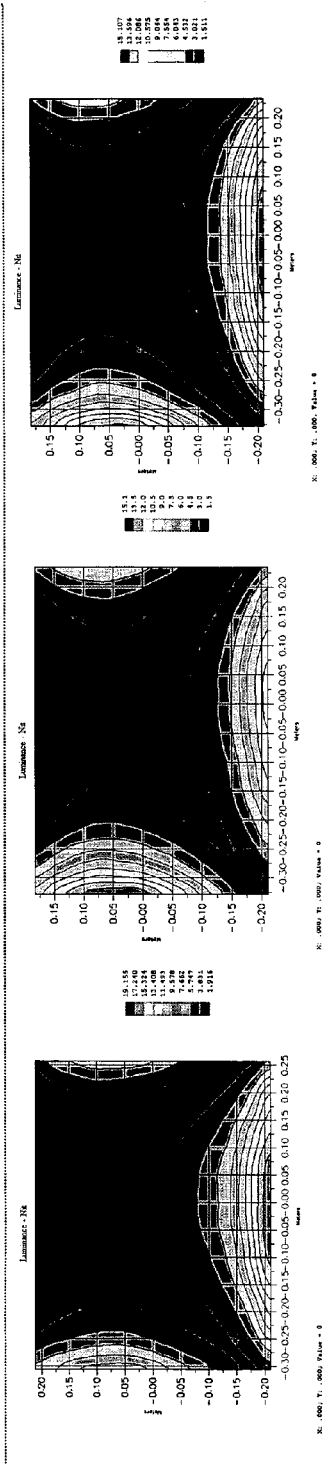
Fig. 4A-3  Fig. 4A-2 25°C/RA-0hr  Fig. 4A-1
Fig. 4B-3  Fig. 4B-2 80°C/RA-24hr  Fig. 4B-1

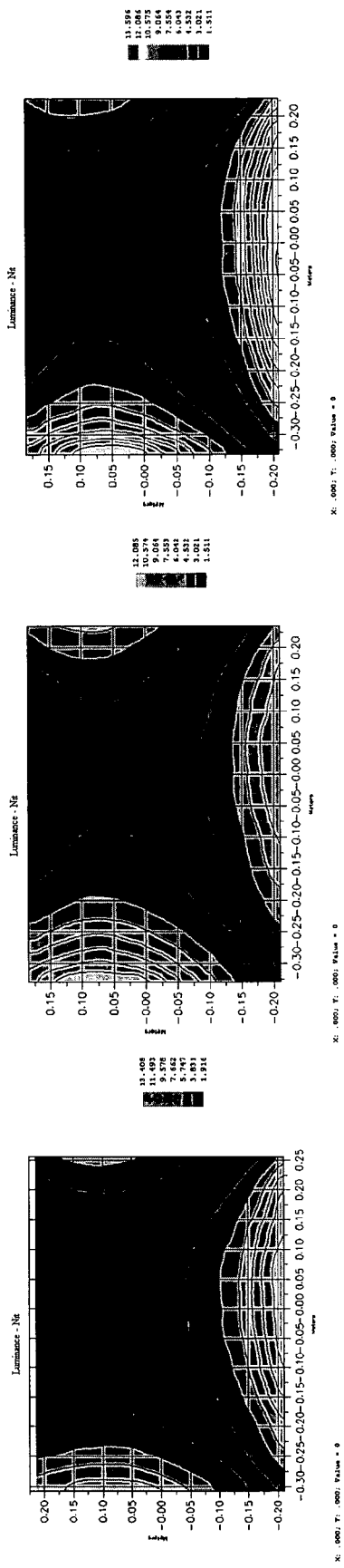

POLARIZING PLATES GRADING METHOD

BACKGROUND OF THE INVENTION

1. Field of the Invention

The present invention relates to a polarizing plate grading method and especially relates to a method of grading the polarization plate based on the value obtained by dividing the difference of the net chromatic difference values measured on two polarization plates by the net chromatic difference value of one of the polarization plates.

2. The Prior Arts

Usually, the liquid crystal display has the benefits of high image quality, small volume, light weight, low driving voltage, low power consumption, and wide application range. As such, it has been widely utilized in the following devices: small, to medium-sized portable TVs, mobile phones, camcorder-players, notebook computers, desk top displays, projector TVs, consumer electronics or computer products. Thus, the liquid crystal display gradually replaces the Cathode Ray Tube (CRT) as the mainstream of display. The polarizing plate 10 or the polarizing film is one of its key components. The functions of the polarizing plate 10 are to filter out lights in unspecific directions, so as to become the light in the specific direction (polarized light). The two upper and lower polarizing plates 10 are arranged on a LCD substrate, and the directions of polarization lines of the upper and lower polarization sheets 10 are mutually perpendicular to each other. The light passing through the lower polarizing plate 10 can not pass through the upper polarizing plate (and it will appear as a dark color) as shown in FIG. 1A. However, if the direction of the molecules of liquid crystal layer 20 disposed therebetween is rotated by the manipulation and control voltage, then the direction of the polarizing light transmitted through the lower polarizing plate 10 can be directed and rotated 90° and pass through the upper polarizing plate 10 (and it will appear as a bright white color). As such, the panel will indicate the variation of brightness and darkness of light as shown in FIG. 1B. Briefly speaking, the major function of the polarizing plate 10 is to convert ordinary natural light without polarization (non polarized light) into polarized light, so as to make the light enter the liquid crystal layer 20 as polarized light.

However, due to the intrinsic property of the material of the polarizing plates 10, the problem of mura will inevitably appear during assembly of the polarizing plate 10, wherein the problem of edge mura will most frequently occur. As shown in FIG. 2, the polarizing plate 10 can roughly be divided into four-color blocks M1', M2', M3' and M4' based on its difference of brightness and darkness and un-uniform distribution of colors. Since the problem of mura on the present polarizing plate market still lacks a publicly recognized examination standard, the examination standard of each manufacturer is different. Thus, manufacturers usually do not accept the examination results of other manufacturers, and this sometimes leads to problems between the seller and the buyer of the polarizing plates 10.

Therefore, there exists the need in the market for standardizing polarizing plate grading methods, so as to solve the above-mentioned problem.

SUMMARY OF THE INVENTION

Therefore, the purpose of the present invention is to provide a polarizing plate grading method, which is based on the value obtained by dividing the net chromatic difference value, that is the result of subtracting the chromatic difference value in the initial state from the chromatic difference value measured after the temperature change of the polarizing plate (temperature endurance test), by the chromatic difference value in the initial state of the polarizing plate, and then utilizing the resulting value as a basis for grading the polarizing plates.

Another purpose of the present invention is to provide a polarizing plate grading method based on the value obtained by dividing the net lux difference value (which is an illuminance unit, namely foot-candle(fc), and is defined as the incident light flux density received on a working surface, and which has a unit conversion of 1fc=10.76 lux) that is the result of subtracting the lux difference value in the initial state from the lux difference value measured after the temperature change of the polarizing plate (temperature endurance test), by the lux difference value in the initial state of the polarizing plate. Then, the resulting value is utilized as a basis for grading the polarizing plates.

According to the above purpose, the present invention is to provide a polarizing plate grading method by first providing a polarizing plate and choosing a first measurement range A1 on the polarizing plate, and then conducting an initial measurement of the polarizing plate. Next, after putting the polarizing plate under $X_1°$ C. for $Y_1$ hours, the first measurement range is measured to obtain the maximum chromatic value $Z_{1max}$ (lux) and the minimum chromatic value $Z_{1min}$ (lux). The minimum value is subtracted from the maximum value to obtain the net chromatic difference value $W_1$, ($W_1=Z_{1max}-Z_{1min}$). Subsequently, the temperature change measurement of the polarizing plate by putting the polarizing plate is conducted under $X_2°$ C. for $Y_2$ hours ($X_2 \neq X_1$), and then measuring the first measurement range to obtain the maximum chromatic value $Z_{2max}$ and the minimum chromatic value $Z_{2min}$. The minimum chromatic value is subtracted from the maximum chromatic value to obtain the net chromatic difference value $W_2$ ($W_2=Z_{2max}-Z_{2min}$). The polarizing plate grading index Q is obtained by subtracting the net chromatic difference value $W_1$ in the initial measurement step from the net chromatic difference value $W_2$ obtained in the temperature change measurement step ($Q=(W_2-W_1)/(W_1)$). In this manner, the polarizing plates can be graded into different levels according to the magnitude of Q value.

A further purpose of the present invention is to provide a polarizing plate grading method based on the value obtained by dividing the net chromatic difference value, that is the result of subtracting the chromatic difference value in the initial state of the polarizing plate from the chromatic difference value measured after it returns to room temperature from that of the temperature change of the polarizing plate (temperature endurance test), by the chromatic difference value in the initial state of the polarizing plate. Then, the resulting value is utilized as a basis for grading the polarizing plates.

A further purpose of the present invention is to provide a polarizing plate grading method based on the value obtained by dividing the net lux difference value, that is the result of subtracting the lux difference value in the initial state of the polarizing plate from the lux difference value measured after it returns to room temperature from that of the temperature change of the polarizing plate (temperature endurance test), by the chromatic difference value in the initial state of the polarizing plate. Then, the resulting value is utilized as a basis for grading the polarizing plates.

According to the above purposes, the present invention provides a polarizing plate grading method by first providing a polarizing plate and choosing a first measurement range A1 on the polarizing plate. An initial measurement of the polarizing plate is conducted. After putting the polarizing plate under $X_1°$ C. for $Y_1$ hours, the first measurement range A1 is measured to obtain the maximum chromatic value $Z_{1max}$ (lux) and the minimum chromatic value $Z_{1min}$ (lux). The minimum chromatic value is subtracted from the maximum chromatic value to obtain the net chromatic difference value $W_1$, ($W_1=Z_{1max}-Z_{1min}$). Subsequently, the temperature change step is conducted on the polarizing plate by putting the polarizing plate under $X_2°$ C. for $Y_2$ hours ($X_2 \neq X_1$). After the recovery measurement of the polarizing plate is conducted by putting the polarizing plate under $X_3°$ C. for $Y_3$ hours, the first measurement range is measured to obtain the maximum chromatic value $Z_{3max}$ and the minimum chromatic value $Z_{3min}$. Thus, the net chromatic difference value $W_3$ is obtained by subtracting the minimum chromatic value from the maximum chromatic value ($W3=Z_{3max}-Z_{3min}$).

The polarizing plate grading index Q is obtained by dividing the value obtained from subtracting the net chromatic difference value W1 obtained in the initial measurement step from the net chromatic difference value W3 obtained in the recovery measurement step, by the net chromatic difference value $W_1$, ($Q=(W_3-W_1)/(W_1)$). Thus, the polarizing plates can be graded according to the magnitude of Q value.

The other purposes and the various advantages of the present invention can be fully disclosed by the detailed description of the following preferred embodiments with reference to the attached drawings.

BRIEF DESCRIPTION OF THE DRAWINGS

The related drawings in connection with the detailed description of the present invention to be made later are described briefly as follows, in which:

FIG. 3A-1 to 3A-2, 3B-1 to 3B-2 are the schematic diagrams indicating the measurement of the chromatic difference distribution of the two samples according to the first embodiment of the present invention;

FIG. 3C is the flowchart describing the first embodiment of the present invention;

FIG. 4A-1 to 4A-3, 48-1 to 4B-3 and FIG. 4C-1 to 4C-3 are the schematic diagrams indicating the measurement of the chromatic difference distribution of the three samples according to the second embodiment of the present invention.

DETAILED DESCRIPTION OF THE PREFERRED EMBODIMENT

Figure 1B:
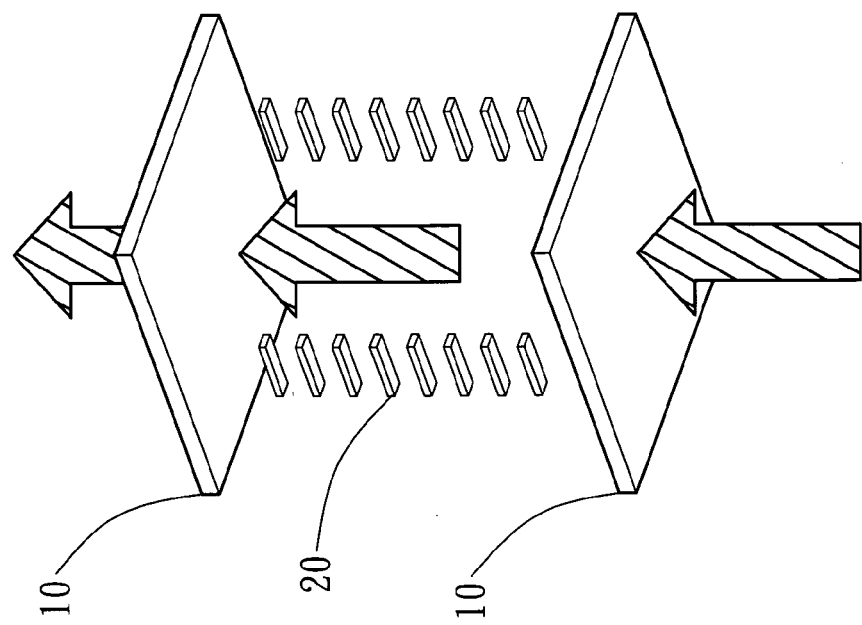
FIGS. 1A & 1B are the schematic diagram of the brightness and darkness effect created by the liquid crystal display (LCD) 20 and the polarizing plates 10 according to the prior art.

In the following, the embodiments of the present invention will be described in detail, wherein the elements in the drawings are not necessarily drawn to scale. Certain scales and the related scales of other parts can be exaggerated to provide a clearer description of the elements, so as to facilitate the understanding of the present invention by people familiar with this technology.

First Embodiment

Figure 1A:
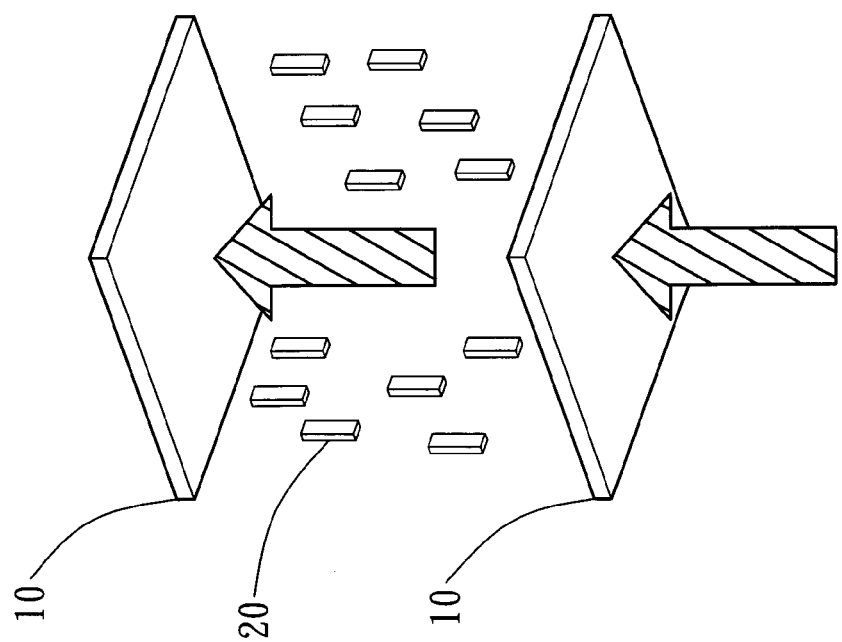
Figure 2:
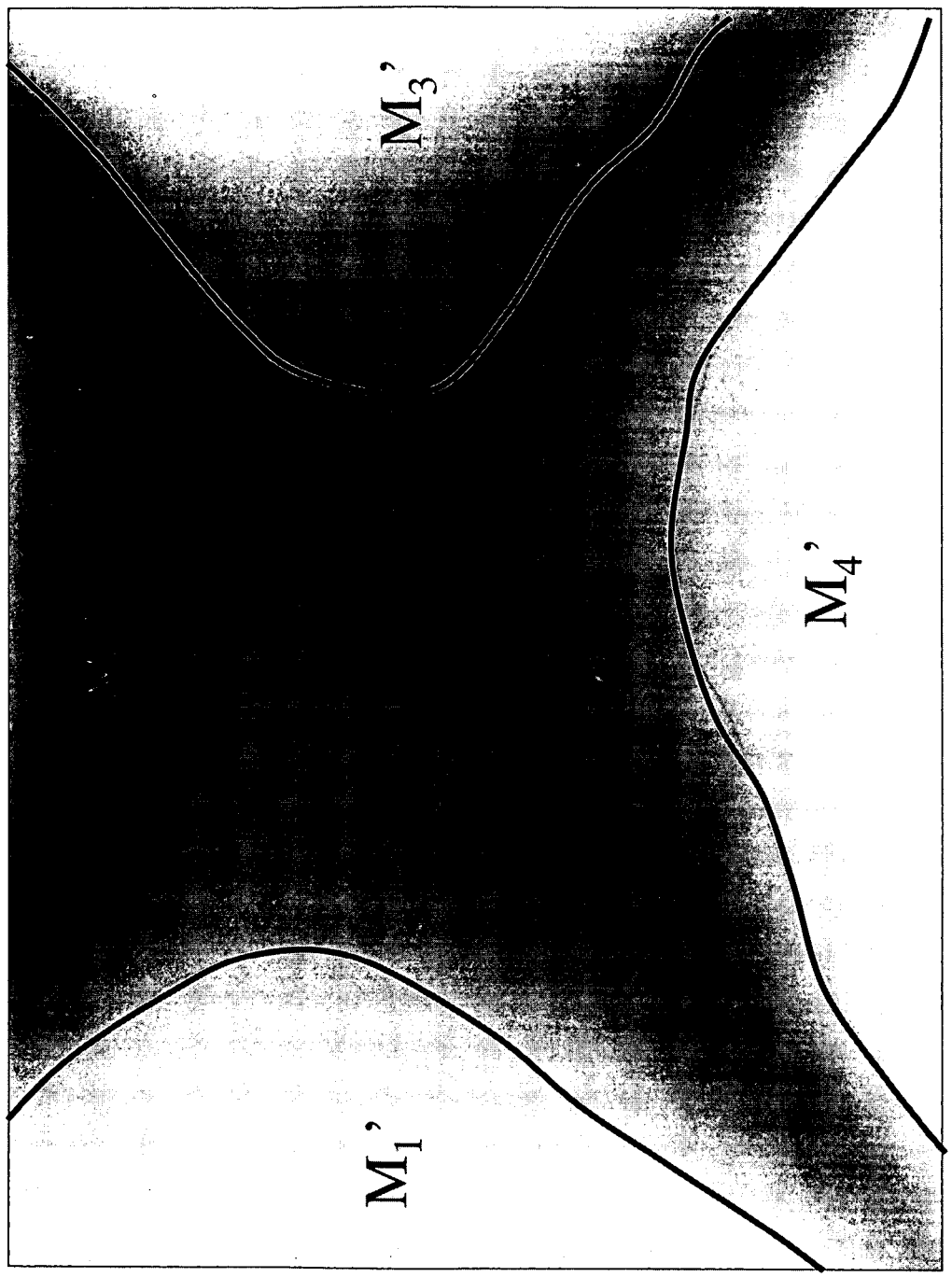
FIG. 2 is the schematic diagram indicating the edge mura of the polarizing plates 10 according to the prior art.
Figures 2, 3A, 3B:
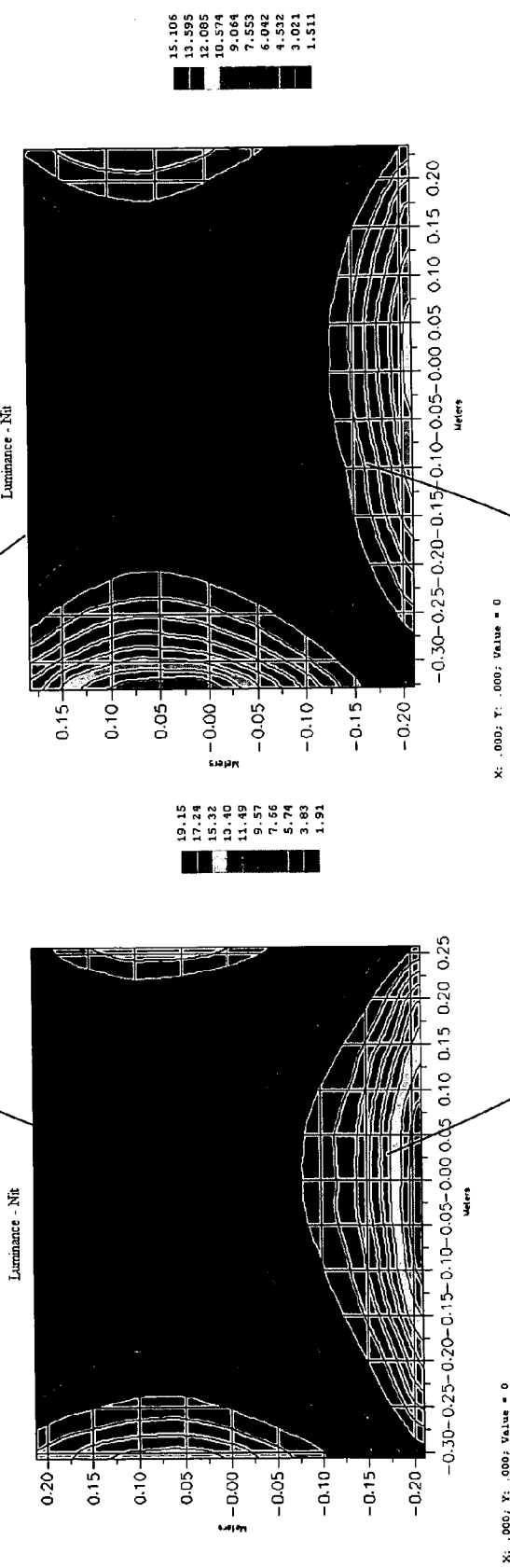

FIG. 3A-1,-2, 3B-1,-2 and 3C indicate, respectively, the schematic diagrams and the flowchart of the chromatic difference distribution of two samples according to the first embodiment of the present invention. The horizontal axis and the vertical axes of FIGS. 3A-1, 3A-2, 3B-1, and 3B-2 are defined, respectively, as the polarizing plate measurement area size distance and the measured chromatic value. FIGS. 3A-1, 3A-2, 3B-1, and 3B-2 indicate, respectively, the chromatic difference distribution schematic diagrams of the two samples under different conditions. Specifically, FIGS. 3A-1 and 3B-1 indicate the chromatic difference distribution schematic diagrams of samples A and B under the first condition (25° C. and 0 hour); and FIGS. 3A-2 and 3B-2 indicate the chromatic difference distribution schematic diagrams of samples A and B under the second condition (80° C. and 24 hours).

In step S300, after providing a polarizing plate 300, a first measurement range A1 on the polarizing plate 300 is chosen. In the present embodiment, the area of the first measurement A1 is equal to the area of the polarizing plate 300.

In step S310, after conducting an initial measurement of the polarizing plate 300, the said first measurement range A1 is measured after putting the polarizing plate 300 under $X_1°$ C. for $Y_1$ hours, so as to obtain the maximum chromatic value $Z_{1max}$(lux) and the minimum chromatic value $Z_{1min}$. Then, the minimum chromatic value is subtracted from the maximum chromatic value to obtain the net chromatic difference value $W_1$ ($W1=Z_{1max}-Z_{1min}$). $X_1$ can be the local room temperature, in the present embodiment, $X_1$ is 25° C. $Y_1$ can be 0–24 hours, and in the present invention, it is 0 hour (for the details of this step, please refer to FIGS. 3A-1, and 3B-1).

In step 320, a temperature change measurement is conducted on the polarizing plate 300 by putting the polarizing plate 300 under $X_2°$ C. ($X_2 \neq X_1$) for $Y_2$ hours. Then, the first measurement range is measured to obtain the maximum chromatic value $Z_{2max}$ and the minimum chromatic value $Z_{2min}$. The minimum chromatic value is subtracted from the maximum chromatic value to obtain the net chromatic difference value W2, ($W_2=Z_{2max}-Z_{2\ min}$). $X_2$ can be 60° C.–120° C. and in the present embodiment, $X_2$ is 80° C. $Y_2$ can be 1–168 hours, and in the present embodiment, $Y_2$ is 24 hours. (for the detail of this step, please refer to FIGS. 3A-2 and 3B-2).

In step S330, the grading index Q of the polarizing plate 300 is obtained by dividing the value obtained from subtracting the net chromatic difference value $W_1$ obtained in the initial measurement step S310 from the net chromatic difference value $W_2$ obtained in the temperature change measurement step S320, by the net chromatic difference value $W_1$ ($Q=(W2=W1)/(W1)$). Thus, the polarizing plates 300 can be graded according to the magnitude of value Q.

In addition, a plurality of temperature change processes can be included in the above-mentioned temperature change measurement step S320. For example, the polarizing plate 300 can be heated from 25° C. to 45° C., and then kept at constant temperature of 45° C. for 8 hours. Thereafter it is heated from 45° C. to 65° C. and then kept at constant temperature of 65° C. for 8 hours. Thereafter, it is heated from 65° C. to 80° C. and kept at constant temperature of 80° C. for 8 hours.

Second Embodiment

Figure 4D:
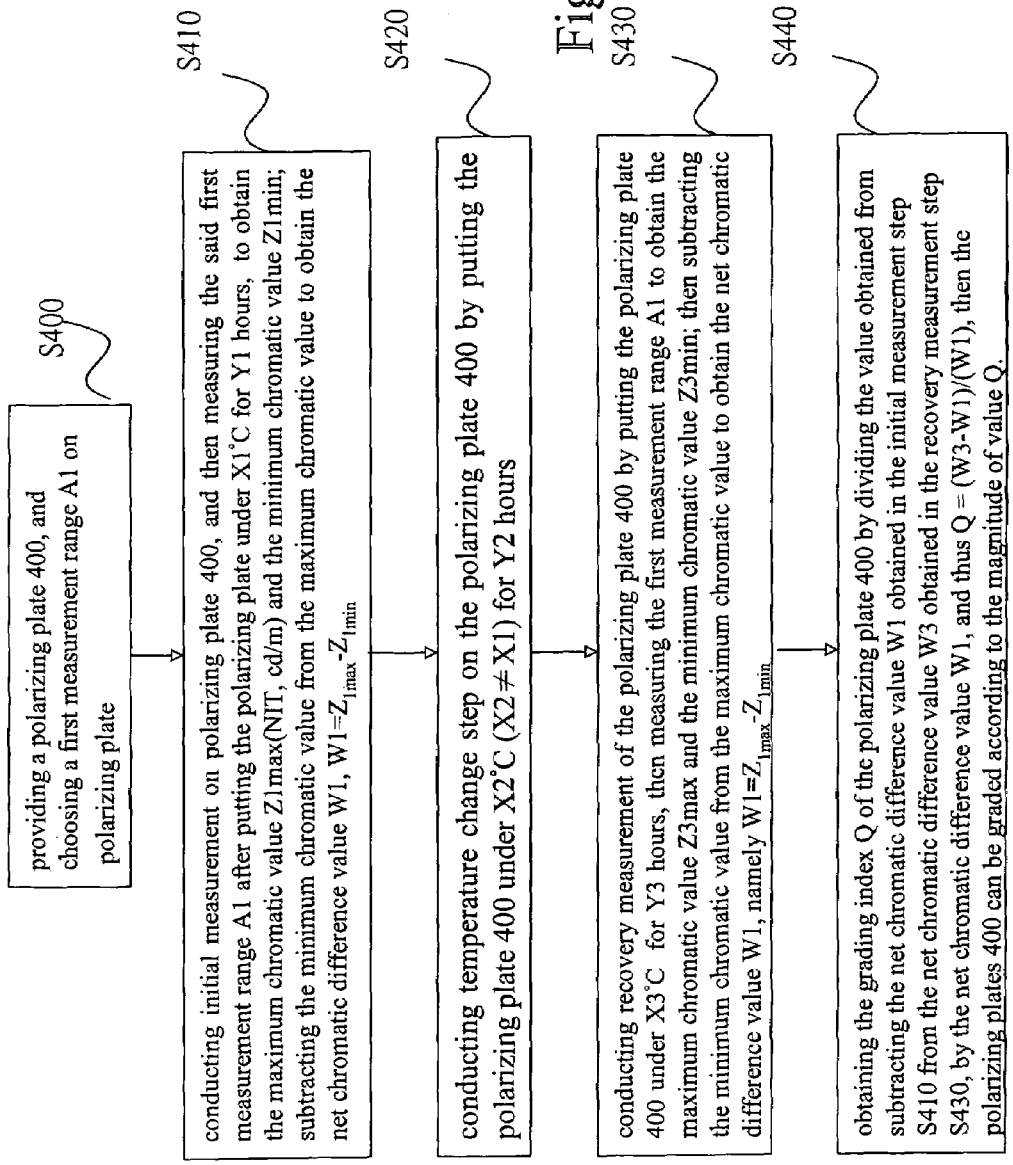
FIG. 4D is the flowchart describing the second embodiment of the present invention.

FIGS. 4A-1,-2,-3, 4B-l,-2,-3, 4C-1,-2,-3, and 4D indicates, respectively, the flowchart and the schematic diagrams of the chromatic difference distributions of three samples according to the second embodiment of the present invention. The horizontal axes and the vertical axes of FIGS. 4A-*l*, 4A-2, 4A-3, 4B-1, 4B-2, 4B-3, 4C-1, 4C-2 and 4C-3 are defined, respectively, as the polarizing plate measurement area size distance and the measured chromatic values. FIGS. 4A-1, 4A-2, 4A-3, 4B-1, 4B-2, 4B-3, 4C-1, 4C-2 and 4C-3 indicate; respectively, the chromatic difference distribution schematic diagrams of the three samples under different conditions. Specifically, FIGS. 4A-1, 4A-2, and 4A-3 indicate the chromatic difference distribution schematic diagrams of sample 1, sample 2 and sample 3 under the condition A (25° C. and 0 hour). FIGS. 4B-1, 4B-2, and 4B-3 indicate the chromatic difference distribution schematic diagrams of sample 1, sample 2 and sample 3 under the condition B (80° C. and 24 hours). FIGS. 4C-1, 4C-2 and 4C-3 indicate the chromatic difference distribution schematic diagrams of sample 1, sample 2 and sample 3 under the condition C (25° C. and 24 hours).

In step S400, after providing a polarizing plate 400, measurement range A1 on polarizing plate 400 is chosen. In the present embodiment, the area of the first measurement range A1 is equal to the area of the polarizing plate 400.

In step S410 after conducting initial measurement on polarizing plate 400, the said first measurement range A1 is measured after putting the polarizing plate under $X_1°$ C. for $Y_1$ hours, so as to obtain the maximum chromatic value $Z_{1max}$(lux) and the minimum chromatic value $Z_{1min}$. Then, the minimum chromatic value is subtracted from the maximum chromatic value to obtain the net chromatic difference value $W_1$ ($W_1 = Z_{1max} - Z_{1min}$). $X_1$ can be the local room temperature, and in the present embodiment, $X_1$ is 25° C. $Y_1$ can be 0–24 hours, and in the present embodiment, it is 0 hour (for the details of this step, please refer to FIGS. 4A-1, 4A-2, and 4A-3).

In step 420, the temperature change measurement is conducted on the polarizing plate 400 by putting the polarizing plate 400 under $X_2°$ C. ($X_2 \neq X_1$) for $Y_2$ hours. $X_2$ can be 60° C.–120° C. and in the present embodiment, $X_2$ is 80° C. $Y_2$ can be 1–168 hours, and in the present embodiment, $Y_2$ is 24 hours (for the details of this step, please refer to FIGS. 4B-1, 4B-2, and 4B-3).

In step 430, a recovery measurement is conducted on the polarizing plate 400 by putting the polarizing plate 400 under $X_3°$ C. for $Y_3$ hours. Then, the first measurement range A1 is measured to obtain the maximum chromatic value $Z_{3max}$ and the minimum chromatic value $Z_{3min}$. The minimum chromatic value is subtracted from the maximum chromatic value to obtain the net chromatic difference value $W_1$ ($W_3 = Z_{3max} - Z_{3min}$). $X_3$ can be the local room temperature and, in the present embodiment, is 25° C. $Y_2$ can be 0–24 hours and, in the embodiment, is 24 hours (for the details of this step, please refer to FIGS. 4C-1, 4C-2 and 4C-3).

In step S440, the grading index Q of the polarizing plate 400 is obtained by dividing the value obtained from subtracting the net chromatic difference value $W_1$ obtained in the initial measurement step S410 from the net chromatic difference value $W_3$ obtained in the recovery measurement step S430, by the net chromatic difference value $W_1$ ($Q = (W_3 - W_1)/(W_1)$). Thus, the polarizing plates 400 can be graded according to the magnitude of value Q.

In addition, a plurality of temperature change processes can be included in the above-mentioned temperature change measurement step S420. For example, the polarizing plate 400 can be heated from 25° C. to 45° C. and kept at a constant temperature of 45° C. for 8 hours. Thereafter, it is heated from 45° C. to 65° C. and kept at a constant temperature of 65° C. for 8 hours. Thereafter, it is heated from 65° C. to 80° C. and kept at a constant temperature of 80° C. for 8 hours.

Though a plurality of preferred embodiments have been described above, it is intended to be illustrative rather than restrictive. Various changes and modifications can be made by the people familiar with this technology without departing from the spirit and scope of the present invention, and the protection scope of the present invention can be considered as defined by the following claims.

What is claimed is:

1. A polarizing plate grading method, comprising:
   providing a polarizing plate;
   choosing a first measurement range $A_1$ on the polarizing plate;
   conducting an initial measurement of the polarizing plate by putting the polarizing plate under $X_1°$ C. for $Y_1$ hours, then measuring a first measurement range to obtain a maximum chromatic value $Z_{1max}$, and a minimum chromatic value $Z_{1min}$, and then subtracting the minimum value from the maximum value to obtain the net chromatic difference value $W_1$;
   conducting a temperature change measurement on the polarizing plate by putting the polarizing plate under $X_2°$ C. ($X_2 \neq X_1$) for $Y_2$ hours, then measuring a first measurement range to obtain a maximum chromatic value $Z_{2max}$ and a minimum chromatic value $Z_{2min}$, and by subtracting the minimum chromatic value from the maximum chromatic value to obtain the net chromatic difference value $W_2$;
   obtaining a polarizing plate grading index Q by dividing the value obtained from subtracting the net chromatic difference value $W_1$ from the net chromatic difference value $W_2$, by the net chromatic difference value $W_1$;
   grading the polarizing plate according to the polarizing plate grading index; and
   providing the grading information to the user.

2. The polarizing plate grading method as claimed in claim 1, wherein the maximum and minimum chromatic value of the said first measurement range can be replaced by a measured maximum lux value and a minimum lux value of the first measurement range, and the chromatic values in the various subsequent corresponding calculation formulas can be replaced by the lux values.

3. The polarizing plate grading method as claimed in claim 1, wherein in the initial measurement, $X_1$ is a local room temperature, and $Y_1$ is approximately 0–24 hours.

4. The polarizing plate grading method as claimed in claim 3, wherein in the initial measurement, $X_1$ is 25° C.

5. The polarizing plate grading method as claimed in claim 1, wherein in the temperature change measurement, $X_2$ is 60° C–120° C., and $Y_2$ is approximately 1–168 hours.

6. The polarizing plate grading method as claimed in claim 1, wherein the temperature change measurement can further include a plurality of temperature change measurements.

7. A polarizing plate grading method, comprising:
   providing a polarizing plate;
   choosing a first measurement range A1 on the polarizing plate;
   conducting an initial measurement of the polarizing plate, putting the polarizing plate under $X_1°$ C. for $Y_1$ hours, then measuring to obtain the maximum chromatic value $Z_{1max}$(lux), and the minimum chromatic value $Z_{1min}$ (lux), and subtracting the minimum value from the maximum value to obtain a net chromatic difference value $W_1$;

conducting a temperature change measurement on the polarizing plate by putting the polarizing plate under $X_2°$ C. for $Y_2$ hours ($X_2 \neq X_1$);

conducting a recovery measurement on the polarizing plate by putting the polarizing plate under $X_3°$ C. for $Y_3$ hours, then measuring the first measurement range to obtain the maximum chromatic value $Z_{3max}$ and the minimum chromatic value $Z_{3min}$, and subtracting the minimum chromatic value from the maximum chromatic value to obtain the net chromatic difference value $W_3$;

obtaining a polarizing plate grading index Q by dividing a value obtained from subtracting the net chromatic difference value $W_1$ from the net chromatic difference value $W_3$, by the net chromatic difference value $W_1$;

grading the polarizing plate according to the polarizing plate grade index; and providing the grading information to the user.

8. The polarizing plate grading method as claimed in claim 7, wherein the maximum and minimum chromatic value of the said initial measurement can be replaced by a measured maximum lux value and a minimum lux value, and the chromatic values in the various subsequent corresponding calculation formulas can be replaced by the lux values.

9. The polarizing plate grading method as claimed in claim 7, wherein in the initial measurement, $X_1$ is a local room temperature, and $Y_1$ is approximately 0–24 hours.

10. The polarizing plate grading method as claimed in claim 9, wherein in the initial measurement, $X_1$ is 25° C.

11. The polarizing plate grading method as claimed in claim 7, wherein in the temperature change measurement, $X_2$ is 60° C.–120° C., and $Y_2$ is approximately 1–168 hours.

12. The polarizing plate grading method as claimed in claim 7, wherein the temperature change measurement can further include a plurality of temperature change measurements.

13. The polarizing plate grading method as claimed in claim 7, wherein in the recovery measurement, $X_3$ is a local room temperature, and $Y_3$ is approximately 0–24 hours.

14. The polarizing plate grading method as claimed in claim 13, wherein in the recovery measurement, $X_3$ is 25° C.

* * * * *